United States Patent
Wang (10) Patent No.: US 11,323,619 B2
(45) Date of Patent: May 3, 2022

(54) METHOD OF CONTROLLING CAMERA AND TERMINAL

(71) Applicant: VIVO MOBILE COMMUNICATION CO., LTD., Guangdong (CN)

(72) Inventor: Jianhui Wang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/186,432

(22) Filed: Feb. 26, 2021

(65) Prior Publication Data

US 2021/0185237 A1 Jun. 17, 2021

Related U.S. Application Data

(63) Continuation of application No. PCT/CN2019/097695, filed on Jul. 25, 2019.

(30) Foreign Application Priority Data

Aug. 30, 2018 (CN) .......................... 201811002977.1

(51) Int. Cl.
*H04N 5/225* (2006.01)
*H04N 5/232* (2006.01)
*G06F 1/3203* (2019.01)

(52) U.S. Cl.
CPC ..... *H04N 5/232411* (2018.08); *G06F 1/3203* (2013.01); *H04N 5/23216* (2013.01)

(58) Field of Classification Search
CPC ......... H04N 5/232411; H04N 5/23215; H04N 5/2257; G06F 1/3203; H04M 1/0235; H04M 1/72454; H04M 1/0264; H04M 1/026; H04M 1/0266; H04W 52/0251; H04W 52/0277; H04W 52/028; H04W 52/0261

See application file for complete search history.

(56) References Cited

U.S. PATENT DOCUMENTS 7,389,441 B2 * 6/2008 Horii ..................... G06F 1/3203
713/300
2003/0142228 A1 * 7/2003 Flach ............... H04N 5/232411
348/335

(Continued)

FOREIGN PATENT DOCUMENTS

CN 105163028 A 12/2015
CN 106817540 A 6/2017

(Continued)

OTHER PUBLICATIONS

International Search Report and Written Opinion of the International Searching Authority regarding International Application No. PCT/CN2019/097695, dated Oct. 24, 2019. Translation provided by Bohui Intellectual Property.

(Continued)

*Primary Examiner* — Kelly L Jerabek
(74) *Attorney, Agent, or Firm* — Harness, Dickey & Pierce, P.L.C.

(57) ABSTRACT

A method of controlling a camera includes: obtaining a remaining power of the terminal; and in a case where the remaining power of the terminal meets a preset condition and the terminal meets a camera raising-lowering condition, controlling the camera to maintain a raised state or retracted state.

9 Claims, 9 Drawing Sheets

(56) References Cited

U.S. PATENT DOCUMENTS

2010/0123789 A1   5/2010   Yang
2013/0339764 A1   12/2013  Lee et al.
2017/0078561 A1   3/2017   Wang

FOREIGN PATENT DOCUMENTS

| CN | 107219914 A | 9/2017 |
| CN | 107613198 A | 1/2018 |
| CN | 207304636 U | 5/2018 |
| CN | 109005262 A | 12/2018 |
| TW | I299813 B | 8/2008 |
| TW | 201119363 A | 6/2011 |

OTHER PUBLICATIONS

First Office Action regarding Chinese Patent Application No. 201811002977.1, dated Apr. 11, 2019. Translation provided by Bohui Intellectual Property.

* cited by examiner

METHOD OF CONTROLLING CAMERA AND TERMINAL

CROSS-REFERENCE TO RELATED APPLICATIONS

This application is a Bypass Continuation Application of PCT/CN2019/097695 filed on Jul. 25, 2019, which claims priority to Chinese Patent Application No. 201811002977.1 filed on Aug. 30, 2018, which are incorporated herein by reference in their entirety.

TECHNICAL FIELD

The present disclosure relates to the field of terminal technologies, and in particular, to a method of controlling a camera and a terminal.

BACKGROUND

In the design of a full-screen terminal, in order to prevent a front-facing camera from affecting a screen-to-body ratio of the terminal, a solution in the related art is to design the front-facing camera to be a raising-lowering-type one. When there is a need to take a picture with the front-facing camera, a driving mechanism in the terminal drives the front-facing camera to raise the front-facing camera out of a housing of the terminal, so as to accomplish the photographing with the screen-to-body ratio of the terminal being ensured.

The above solution brings new problems. When taking a picture with a terminal, users all experienced a process— raising the camera, taking a picture, finishing the photographing operation, and retracting the camera. In this process, the driving mechanism needs to drive the camera to be raised and lowered. In a case where a user has taken pictures several times, the driving mechanism works frequently, which greatly increases the power consumption of the terminal, and causes a reduction in using time of the terminal.

SUMMARY

According to a first aspect of the embodiments of the present disclosure, a method of controlling a camera is provided, which is applied to a terminal. The terminal includes a display screen and a camera, and operating states of the camera include a raised state and a retracted state. The method includes: obtaining a remaining power of the terminal; and in a case where the remaining power of the terminal meets a preset condition and the terminal meets a camera raising-lowering condition, controlling the camera to maintain the raised state or the retracted state.

According to a second aspect of the embodiments of the present disclosure, a terminal is provided. The terminal includes a display screen and a camera, and operating states of the camera include a raised state and a retracted state. The terminal further includes: a first obtaining module used to obtain a remaining power of the terminal; and a first control module used to control the camera to maintain the raised state or the retracted state in a case where the remaining power of the terminal meets a preset condition and the terminal meets a camera raising-lowering condition.

According to a third aspect of the embodiments of the present disclosure, another terminal is provided. The terminal includes a processor, a memory and a computer program that is stored in the memory and executable on the processor. The computer program, when executed by the processor, implements steps in the method of controlling a camera as described in the first aspect.

According to a fourth aspect of the embodiments of the present disclosure, a non-transitory computer-readable storage medium is provided. The non-transitory computer-readable storage medium stores thereon a computer program that, when executed by a processor, implements steps in the method of controlling a camera as described in the first aspect.

BRIEF DESCRIPTION OF THE DRAWINGS

In order to describe technical solutions in embodiments of the present disclosure more clearly, the accompanying drawings to be used in the description of the embodiments of the present disclosure will be introduced briefly. However, the accompanying drawings to be described below are merely some embodiments of the present disclosure, and a person of ordinary skill in the art may also obtain other drawings according to those drawings without paying any creative effort.

DETAILED DESCRIPTION

The technical solutions in embodiments of the present disclosure will be described clearly below with reference to accompanying drawings in the embodiments of the present disclosure. However, the described embodiments are merely some but not all embodiments of the present disclosure. All other embodiments obtained on a basis of the embodiments of the present disclosure by a person of ordinary skill in the art without paying any creative effort shall be included in the protection scope of the present disclosure.

A terminal in the embodiments of the present disclosure may be a mobile phone, a tablet computer, a notebook computer, a palm computer, a vehicle-mounted terminal, a wearable device, a pedometer, and the like. The terminal includes, but is not limited to, a camera, a driving mechanism used to drive the camera to be raised or lowered and a display screen. The driving mechanism can drive the camera to reciprocate along a predetermined direction, which allows the camera to have two operating states: a raised state and a retracted state.

It will be noted that, the terminal may include a plurality of cameras, and at least one of the plurality of cameras can be driven via the driving mechanism to be raised and lowered. For example, the terminal is a full-screen display mobile phone including a front-facing camera and a rear-facing camera, and the front-facing camera and/or the rear-facing camera can be driven by a driving mechanism to be raised and lowered. In an example where the front-facing camera is used to take pictures, when a user takes a picture with the full-screen display mobile phone, the front-facing camera is in a raised state.

Figure 1:
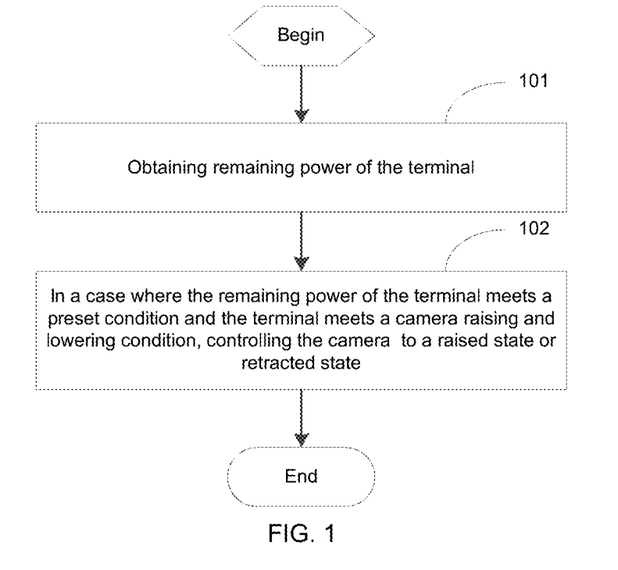
FIG. 1 is a schematic flow diagram of a method of controlling a camera, in accordance with the embodiments of the present disclosure.

Referring to FIG. 1, the embodiments of the present disclosure provide a method of controlling a camera, which is applied to a terminal. Specific steps are as follows:

step 101, obtaining a remaining power of the terminal; and step 102, in a case where the remaining power of the terminal meets a preset condition and the terminal meets a camera raising-lowering condition, controlling the camera to maintain the raised state or the retracted state.

In the embodiments of the present disclosure, the preset condition is that the remaining power of the terminal is less than or equal to a power threshold. The camera raising-lowering condition is a condition under which the camera needs to be raised or lowered, for example, when a user open a video chat application, the camera needs to be raised, and opening the video chat application is a camera raising-lowering condition. The content of the camera raising-lowering condition is not specifically limited in the embodiments of the present disclosure.

In the embodiments of the present disclosure, in the case where the remaining power of the terminal meets the preset condition and the terminal meets the camera raising-lowering condition, the camera of the terminal is maintained in the raised state or the retracted state to avoid an increase in the power consumption of the terminal due to frequently raising or lowering the camera.

Operating modes of the driving mechanism includes a first operating mode and a second operating mode. The first operating mode is an operating mode in which the driving mechanism does not respond to a control instruction for driving the camera to be lowered or raised; and the second operating mode is an operating mode in which the driving mechanism can respond to the control instruction for driving the camera to be lowered or raised.

In an example where the camera is a front-facing camera, and the operating state of the camera is the raised state when the driving mechanism enters the first operating mode, the user has a high demand for taking pictures with the front-facing camera in this scenario. When the user takes a picture with the front-facing camera or uses an application that needs to shoot a video with the front-facing camera, since the camera has already been in the raised state, the camera can start to operate immediately. When the user finishes the photographing operation or close the application that needs to shoot a video with the front-facing camera, the driving mechanism will receive a control instruction for driving the camera to be lowered. However, since the driving mechanism is in the first operating mode, the driving mechanism will not respond to the control instruction for driving the camera to be lowered, and the operating state of the camera continues to be the raised state. In this way, by not responding to the control instruction for driving the camera to be lowered, the camera can start to operate immediately based on the current raised state, which prevents the driving mechanism from repeatedly driving the camera to be raised and lowered, and reduces the power consumption of the terminal.

In an example where the camera is a front-facing camera and the operating state of the camera is the retracted state when the driving mechanism enters the first operating mode, the user has a low demand for taking pictures with the front-facing camera in this scenario. When the user touches a switch of the front-facing camera on the terminal due to incorrect manipulation, the driving mechanism will receive the control instruction for driving the camera to be raised. However, since the driving mechanism is in the first operating mode, the driving mechanism will not respond to the control instruction, and the operating state of the camera is then maintained to be the retracted state.

Similarly, when the user open the application that needs to shoot a video with the front-facing camera (e.g., an application with a video chat function) due to incorrect manipulation, the driving mechanism will not respond to the control instruction for driving the camera to be raised. In this way, by not responding to the control instruction for driving the camera to be raised, a phenomenon that the driving mechanism operates due to users incorrect manipulation is avoided, and unnecessary power consumption is prevented.

In the embodiments of the present disclosure, the driving mechanism in the first operating mode may not respond to the control instruction for driving the camera to be lowered or raised, which allows the camera to be maintained in the raised state or the retracted state and avoids increasing power consumption of the terminal due to the driving mechanism frequently driving the camera to be raised or lowered.

The embodiments of the present disclosure provide another method of controlling a camera, which is applied to a terminal. The terminal includes a driving mechanism for driving the camera to be raised or lowered. Operating modes of the driving mechanism include a first operating mode and a second operating mode. The first operating mode is an operating mode in which the driving mechanism does not respond to a control instruction for driving the camera to be lowered or raised. The second operating mode is an operating mode in which the driving mechanism responds to the control instruction for driving the camera to be lowered or raised.

Figure 2:
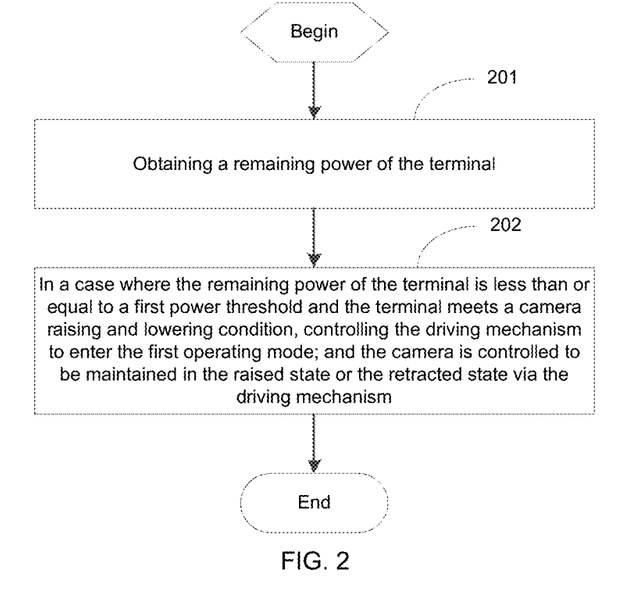
FIG. 2 is another schematic flow diagram of a method of controlling a camera, in accordance with the embodiments of the present disclosure.

Referring to FIG. 2, specific steps of the method are as follows:

step 201, obtaining a remaining power of the terminal; and step 202, in a case where the remaining power of the terminal is less than or equal to a first power threshold and the terminal meets a camera raising-lowering condition, controlling the driving mechanism to enter the first operating mode, so that the driving mechanism controls the camera to maintain the raised state or retracted state.

In the embodiments of the present disclosure, in the case where the remaining power of the terminal is less than or equal to the first power threshold, it indicates that the terminal is currently low on power, and the terminal needs to control the driving mechanism to enter the first operating mode.

The first power threshold may be a power threshold pre-stored in the terminal. Alternatively, the first power threshold may also be a power threshold set by the user, e.g., the first power threshold may be 50%, and a value of the first power threshold is not specifically limited in the embodiments of the present disclosure.

In the embodiments of the present disclosure, in the case where the remaining power of the terminal is less than or equal to the first power threshold, the driving mechanism is controlled to enter the first operating mode, which will allow the camera to be maintained in the raised state or retracted state and avoid increasing the power consumption of the terminal due to the driving mechanism frequently driving the camera to be raised or lowered.

Figure 3:
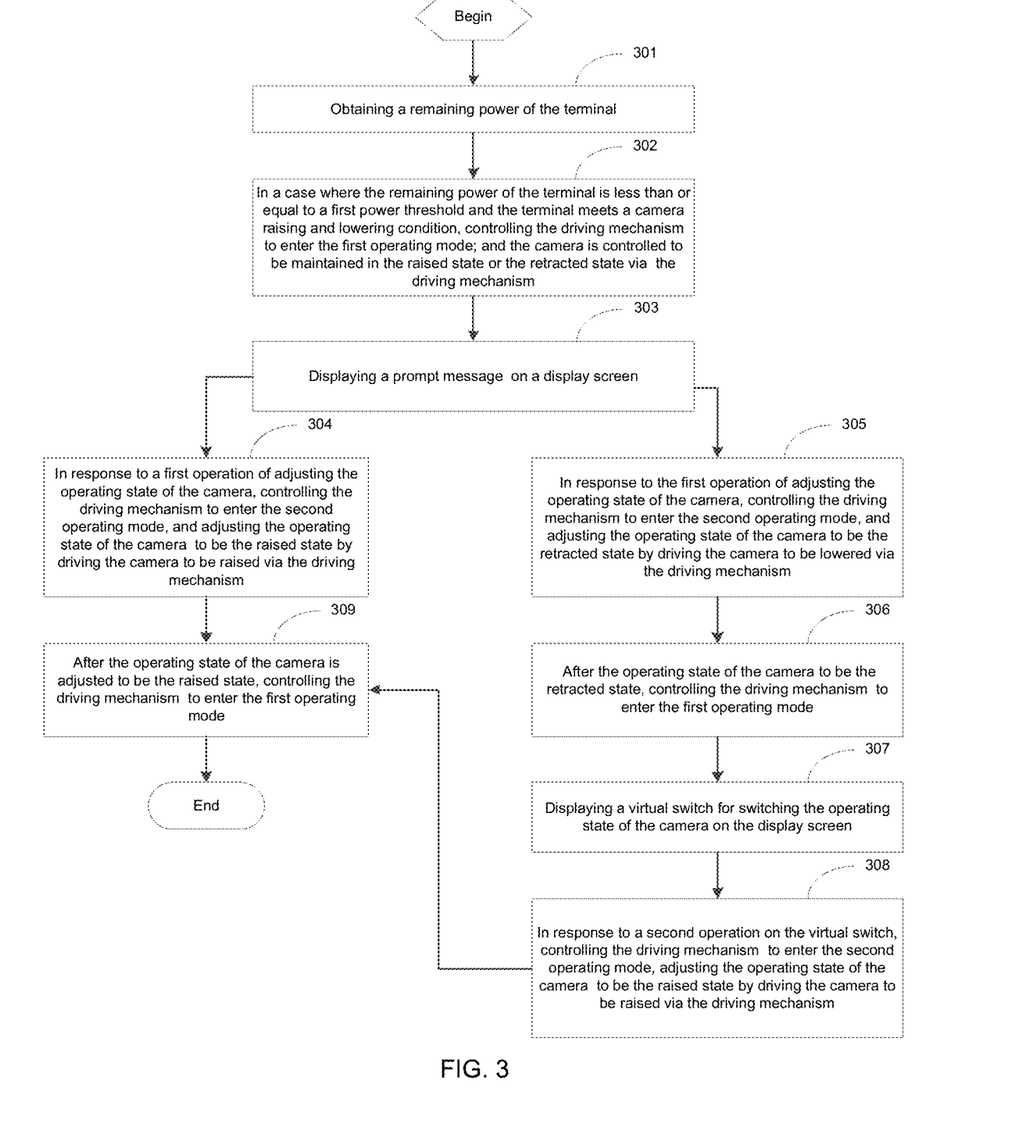
FIG. 3 is yet another schematic flow diagram of a method of controlling a camera, in accordance with the embodiments of the present disclosure.

Referring to FIG. 3, the embodiments of the present disclosure provide another method of controlling a camera, which is applied to a terminal. Specific steps of the method are as follows:

step 301, obtaining a remaining power of the terminal.

step 302, in a case where the remaining power of the terminal is less than or equal to a first power threshold and the terminal meets a camera raising-lowering condition, controlling the driving mechanism to enter the first operating mode, so that the driving mechanism controls the camera to maintain the raised state or retracted state.

For step 301 and step 302, reference may be made to step 201 and step 202 in FIG. 2, which will not be repeated herein.

step 303, displaying a prompt message on the display screen; and then step 304 or step 305 is performed.

In the embodiments of the present disclosure, the prompt message is used to prompt whether to adjust the operating state of the camera, and the prompt message may be displayed on the display screen in the form of a floating window. It will be understood that the prompt message may be displayed in a middle area, a top area, or a bottom area of the display screen. The embodiments of the present disclosure do not specifically limit the presentation form and the display position of the prompt message on the display screen.

Figure 4A:
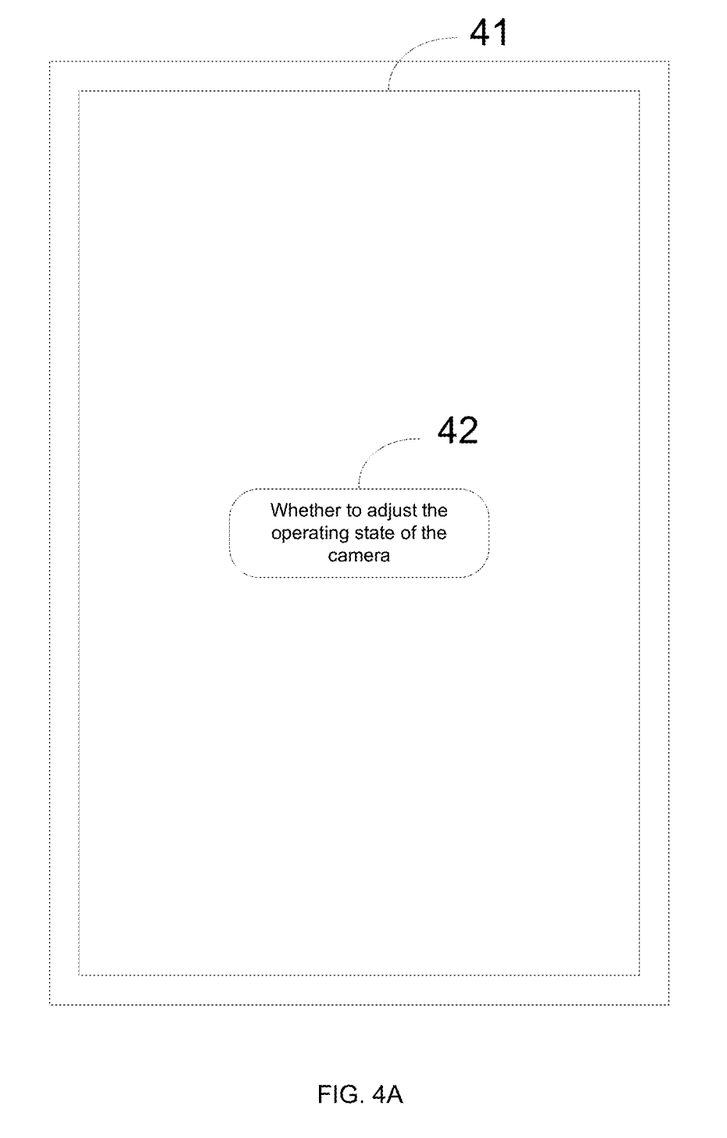
FIG. 4A is a application scenario of a method of controlling a camera, in accordance with the embodiments of the present disclosure.

Referring to FIG. 4A, the floating window 42 is displayed in the middle area of the display screen 41. The floating window 42 contains the content of the prompt message, and the content of the prompt message may be "whether to adjust the operating state of the camera". The content of the prompt message is not specifically limited in the embodiments of the present disclosure.

step 304, in response to a first operation of adjusting the operating state of the camera, controlling the driving mechanism to enter the second operating mode, adjusting the operating state of the camera to be the raised state by driving the camera to be raised via the driving mechanism; and step 309 is then performed.

In step 305, in response to the first operation of adjusting the operating state of the camera, controlling the driving mechanism to enter the second operating mode, adjusting the operating state of the camera to be the retracted state by driving the camera to be lowered via the driving mechanism; and step 306 is then performed.

In the embodiments of the present disclosure, the first operation may be a double-tap operation on the display screen, or the first operation may also be a sliding operation on the display screen. The first operation may be made on a position where the prompt information is displayed on the display screen, and the first operation may also be made on other positions on the display screen. The embodiments of the present disclosure do not limit a specific form of the first operation and the specific position where the first operation is made on the display screen.

When the terminal receives the first operation of the user, the driving mechanism is controlled to enter the second operating mode first; and according to the current operating state of the camera, the terminal drives the camera to be raised or lowered via the driving mechanism, so that the operating state of the camera is adjusted to the raised state from the retracted state or to the retracted state from the raised state.

Figure 4B:
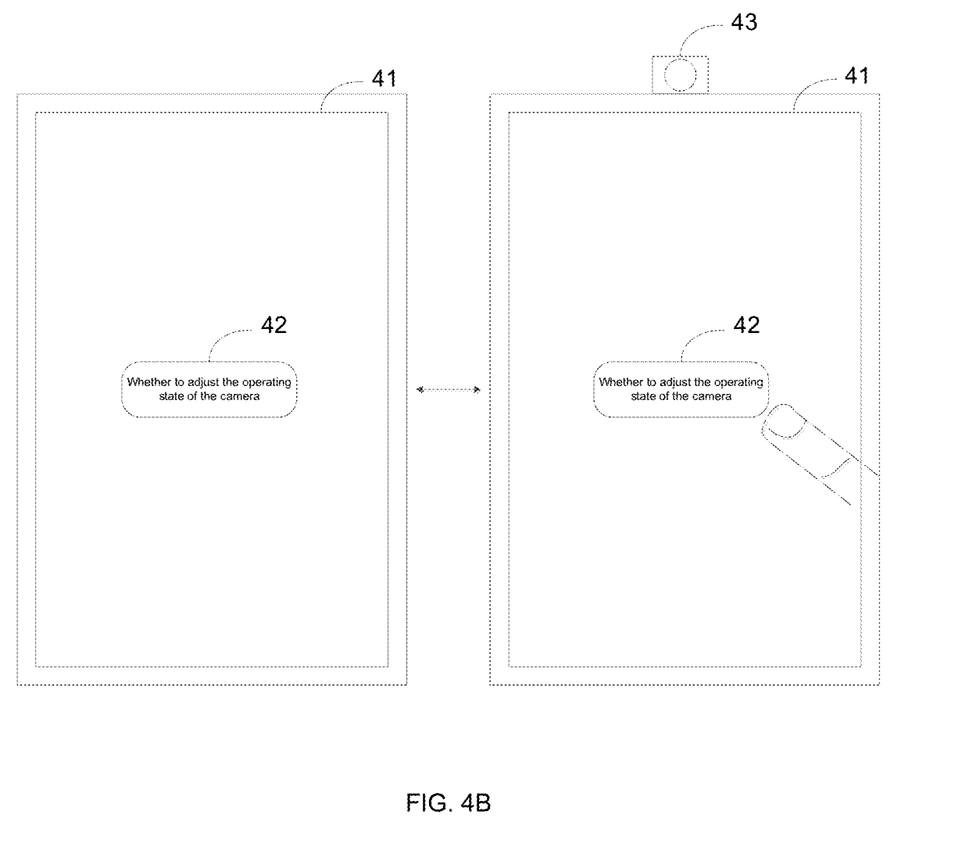
FIG. 4B is another application scenario of a method of controlling a camera, in accordance with the embodiments of the present disclosure.

For example, referring to FIG. 4B, the embodiments of the present disclosure provide an application scenario. In an example where the current operating state of the camera is the retracted state, the terminal will control the driving mechanism to enter the second operating mode after receiving the first operation of the user. Since the operating state of the camera 43 is the retracted state, after the camera is driven to be raised by the driving mechanism, the operating state of the camera 43 is adjusted to the raised state from the retracted state.

Similarly, for a case where the current operating state of the camera is the raised state, reference may be made to the description about FIG. 4B, and details will not be repeated herein.

To avoid incorrect manipulation, the first operation in the embodiments of the present disclosure may be a sliding operation with a specific trajectory.

Figure 4C:
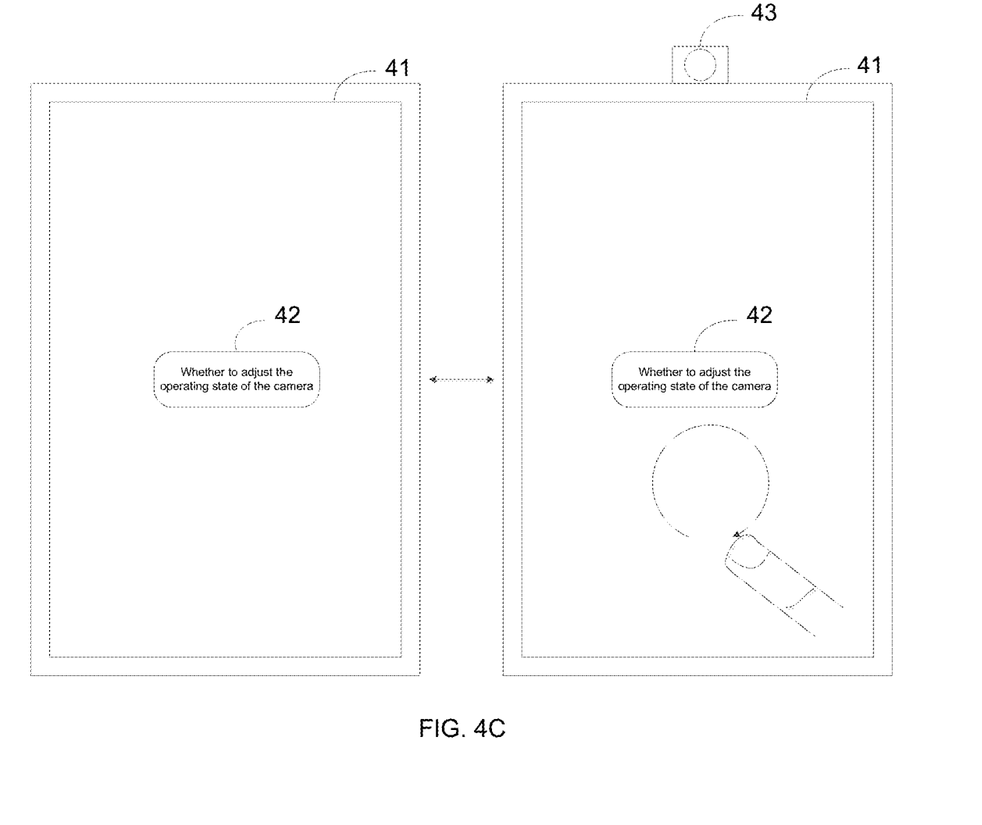
FIG. 4C is yet another application scenario of a method of controlling a camera, in accordance with the embodiments of the present disclosure.

Referring to FIG. 4C, the embodiments of the present disclosure provide another application scenario. In an example where the current operating state of the camera is the retracted state and a first operation is a sliding operation with a circular sliding trajectory, the terminal will control the driving mechanism to enter the second operating mode after receiving the first operation of the user. Since the operating state of the camera 43 is the retracted state, after the camera is driven to be raised by the driving mechanism, the operating state of the camera 43 is adjusted to the raised state from the retracted state.

Similarly, for a case where the current operating state of the camera is the raised state, reference may be made to the description about FIG. 4C, and details are not repeated here.

step 306, controlling the driving mechanism to enter the first operating mode after the operating state of the camera is adjusted to be the retracted state; step 307 is then performed.

In this way, a phenomenon that the driving mechanism operates due to users incorrect manipulation is avoided, and unnecessary power consumption is prevented.

step 307, displaying a virtual switch used to switch the operating state of the camera on the display screen; step 308 is then performed.

step 308, in response to a second operation on the virtual switch, controlling the driving mechanism to enter the second operating mode, and adjusting the operating state of the camera to be the raised state by driving the camera to be raised via the driving mechanism; step 309 is then performed.

Figure 4D:
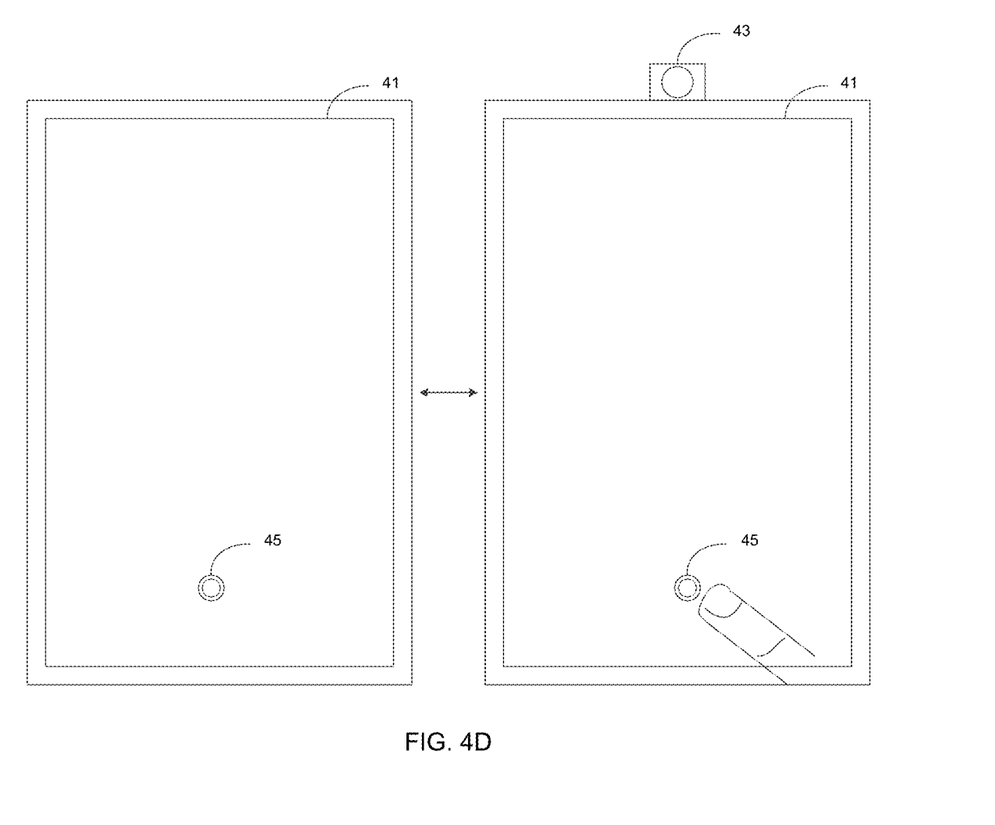
FIG. 4D is yet another application scenario of a method of controlling a camera, in accordance with the embodiments of the present disclosure.

In order to meet the users needs of taking pictures with the front-facing camera, the operating mode of the driving mechanism may be adjusted. Referring to FIG. 4D, when the operating state of the camera 43 is adjusted to be the retracted state, a virtual switch 45 used to switching the operating state of the camera 43 is generated on the display screen 41. It will be understood that, the virtual switch 45 may be displayed in a middle area, a top area or a bottom area of the display screen 41. The display position of the virtual switch 45 on the display screen 41 is not specifically limited in the embodiments of the present disclosure.

When the user needs to take a picture with the camera 43, the driving mechanism may be controlled to enter the second operating mode through the second operation on the virtual switch, and the operating state of the camera is switched to the raised state.

The second operation may be a double-tap operation on the virtual switch 45. Alternatively, the second operation may also be a long-press operation on the virtual switch 45 (e.g., pressing time of the long press operation is 1 second to 2 seconds). The specific form of the second operation is not limited in the embodiments of the present disclosure.

step 309, controlling the driving mechanism to enter the first operating mode after the operating state of the camera is adjusted to be the raised state.

In the embodiments of the present disclosure, the terminal displays a prompt message that is used to prompt whether to adjust the operating state of the camera. In response to a first operation of the user, the terminal adjusts the operating state of the camera to be the raised state or retracted state. Moreover, when the operating state of the camera is adjusted to be the retracted state, a virtual switch used to switch the operating state of the camera is also displayed on the display screen by the terminal. By responding to a second operation of the user to switch the operating state of the camera to be the raised state, the user can flexibly adjust the photographing mode of the terminal and the operating state of the camera, which improves user experience and also reduces the power consumption of the terminal.

Figure 5:
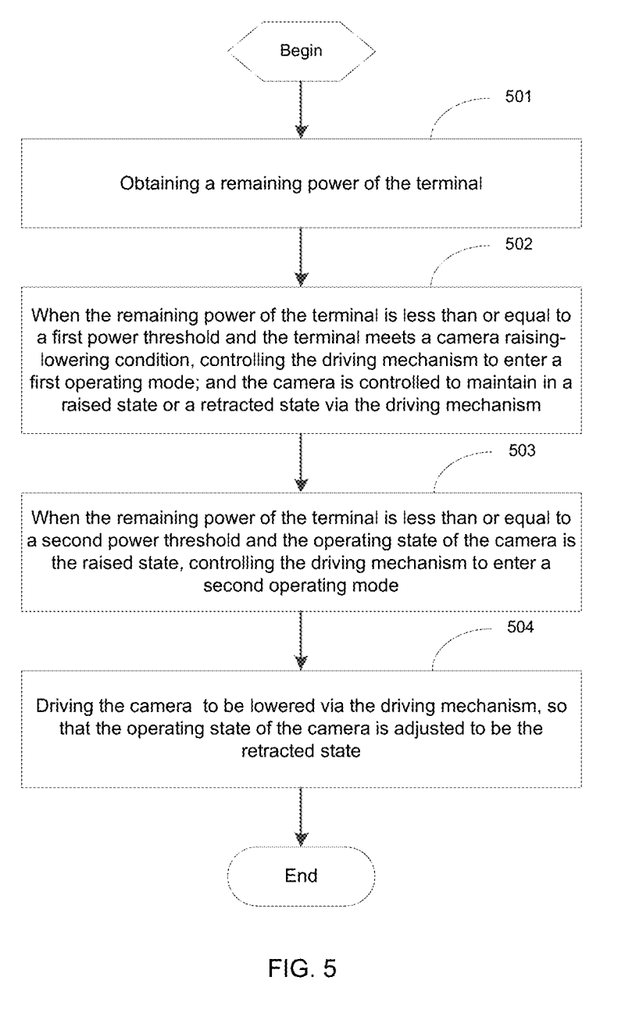
FIG. 5 is yet another schematic flow diagram of a method of controlling a camera, in accordance with the embodiments of the present disclosure.

Referring to FIG. 5, the embodiments of the present disclosure further provide a method of controlling a camera, which is applied to a terminal. Specific steps of the method are as follows:

step 501, obtaining a remaining power of the terminal.

step 502, in a case where the remaining power of the terminal is less than or equal to a first power threshold and the terminal meets a camera raising-lowering condition, controlling the driving mechanism to enter a first operating mode; the camera is controlled to be maintained in a raised state or retracted state via the driving mechanism.

For step 502, reference may be made to step 202 in FIG. 2, which will not be repeated herein.

step 503, in a case where the remaining power of the terminal is less than or equal to a second power threshold and the operating state of the camera is the raised state, controlling the driving mechanism to enter a second operating mode.

In the embodiments of the present disclosure, the second power threshold is less than the first power threshold. The second power threshold may be a power threshold pre-stored in the terminal. Alternatively, the second power threshold may also be a power threshold set by the user. For example, the second power threshold may be 10%, and the value of the second power threshold is not specifically limited in the embodiments of the present disclosure.

In the case where the remaining power is less than or equal to the second power threshold, it indicates that the terminal is about to be out of power. In the case where the terminal is about to be out of power, the terminal will be powered off automatically and the camera will be initialized meanwhile, so as to protect the camera and avoid external collision. If the current operating state of the camera is the raised state, the terminal controls the driving mechanism to enter the second operating mode. In the second operation mode, the driving mechanism can respond to the control instruction for driving the camera to be lowered.

It will be understood that, in a case where the remaining power of the terminal is less than or equal to the second power threshold and the operating state of the camera is the retracted state, since the camera has been retracted, it is unnecessary to control the driving mechanism to enter the second operating mode.

step 504, driving the camera to be lowered via the driving mechanism, so that the operating state of the camera is adjusted to be the retracted state.

In the embodiments of the present disclosure, in the case where the remaining power of the terminal is less than the second power threshold and the operating state of the camera is the raised state, the driving mechanism is controlled to enter the second operating mode, so that the driving mechanism can respond to the control instruction for driving the camera to be lowered, and the operating state of the camera is switched to the retracted state to protect the camera and prolong the service life of the camera.

Figure 6:
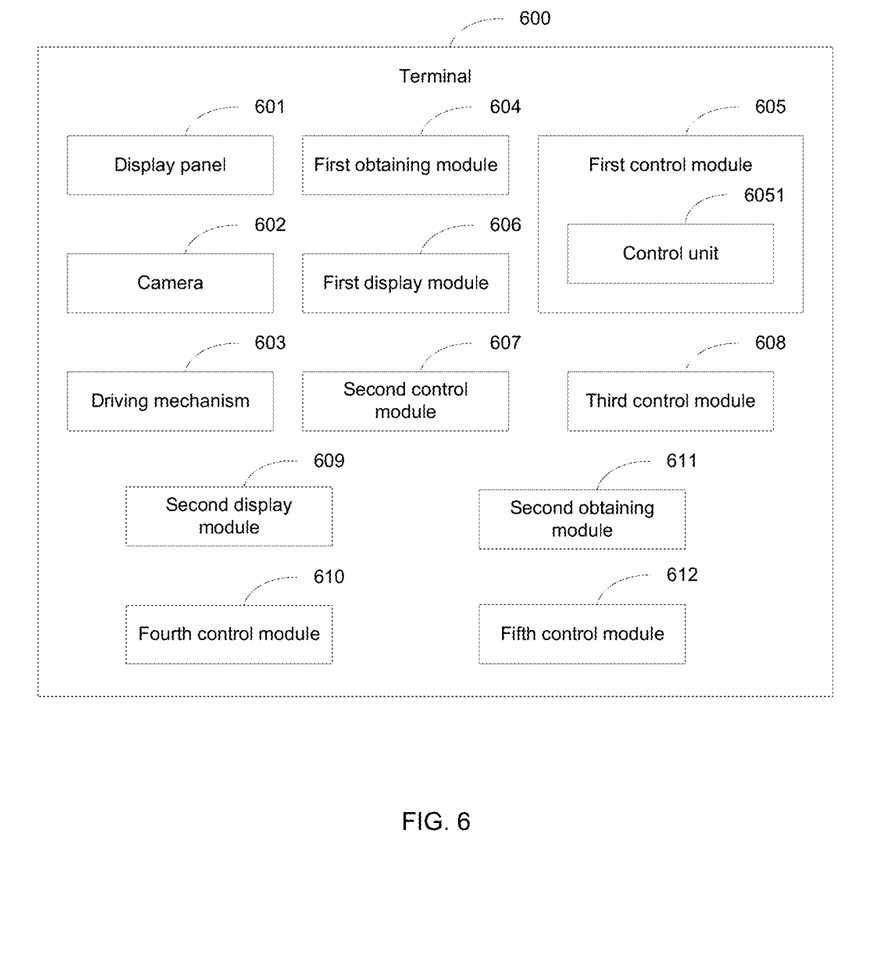
FIG. 6 is a schematic diagram showing a structure of a terminal, in accordance with the embodiments of the present disclosure.

Referring to FIG. 6, the embodiments of the present disclosure provide a terminal 600 that includes a display screen 601 and a camera 602. Operating states of the camera 602 include a raised state and a retracted state. The terminal 600 further includes:

a first obtaining module 604 used to obtain a remaining power of the terminal, and a first control module 605 used to control the camera 602 to maintain the raised state or the retracted state, in a case where the remaining power of the terminal meets a preset condition and the terminal meets a raising and lowering condition of the camera 602.

Optionally, the terminal 600 further includes a driving mechanism 603 used to drive the camera 602 to be raised or lowered, and operating modes of the driving mechanism 603 includes a first operating mode and a second operating mode. The first operating mode is an operating mode in which the driving mechanism 603 does not respond to a control instruction for driving the camera 602 to be lowered or raised; and the second operating mode is an operating mode in which the driving mechanism 603 can respond to a control instruction for driving the camera 602 to be lowered or raised.

The first control module 605 includes:

a control unit 6051 used to control the driving mechanism 603 to enter the first operating mode, in a case where a first remaining power is less than or equal to a first power threshold.

Optionally, the terminal 600 further includes:

a first display module 606 used to display a prompt message on the display screen 601, the prompt message being used to prompt whether to adjust the operating state of the camera 602;

a second control module 607 used to, in response to a first operation of adjusting the operating state of the camera 602, control the driving mechanism 603 to enter the second operating mode, and adjust the operating state of the camera 602 to the raised state from the retracted state or to the retracted state from the raised state by driving the camera 602 to be raised or lowered via the driving mechanism 603; and a third control module 608 used to control the driving mechanism 603 to enter the first operating mode after the operating state of the camera 602 is adjusted to be the raised state or retracted state.

Optionally, the terminal 600 further includes:

a second display module 609 used to display a virtual switch that is used for switching the operating state of the camera 602 on the display screen 601; and a fourth control module 610 used to, in response to a second operation on the virtual switch, control the driving mechanism 603 to enter the second operating mode, and adjust the operating state of the camera 602 to be the raised state by driving the camera 602 to be raised via the driving mechanism 603.

Optionally, the terminal 600 further includes:

a second obtaining module 611 used to obtain a second remaining power of the terminal 600 and the operating state of the camera 602; and a fifth control module 612 used to control the driving mechanism 603 to enter the second operating mode in a case where the second remaining power is less than or equal to a second power threshold and the operating state of the camera 602 is the raised state, and adjust the operating state of the camera 602 to be the retracted state by driving the camera 602 to be lowered via the driving mechanism 603. The second power threshold is less than the first power threshold.

In the embodiments of the present disclosure, the driving mechanism in the first operating mode may not respond to the control instruction for driving the camera to be lowered or raised, so as to maintain the camera in the raised state or the retracted state, which avoids an increase in power consumption of the terminal due to a fact that the driving mechanism frequently drives the camera to be raised or lowered.

Figure 7:
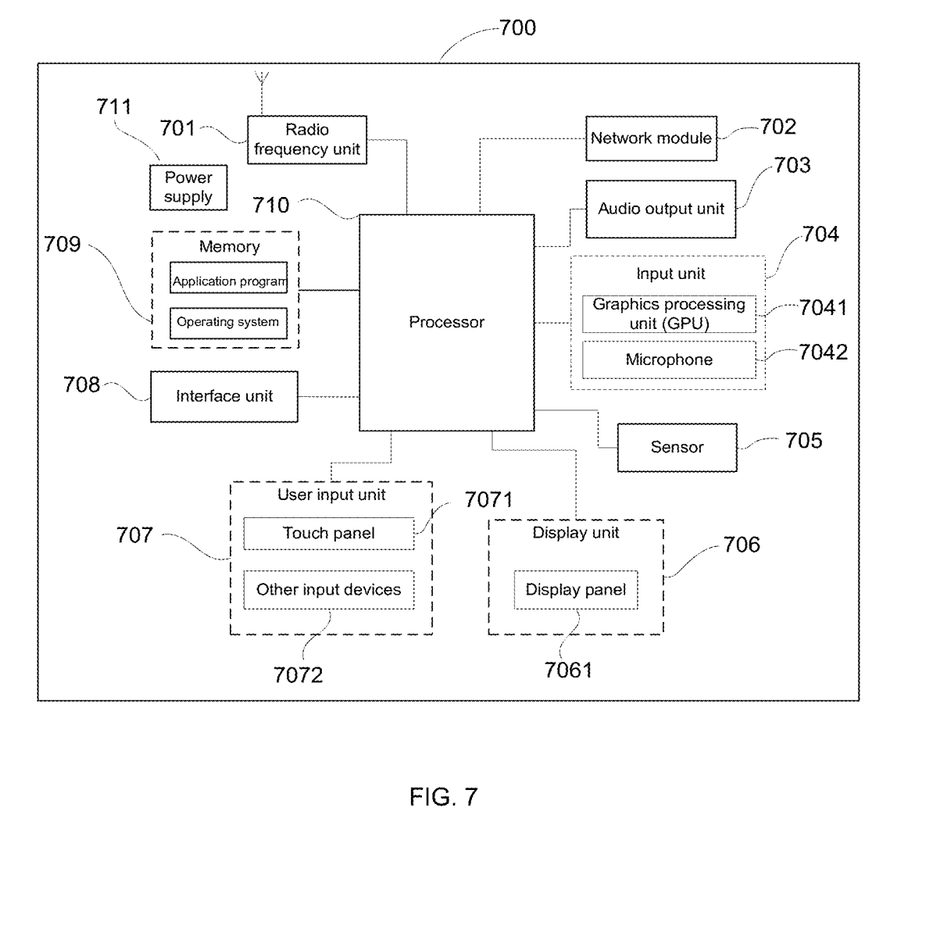
FIG. 7 is a schematic diagram showing a structure of another terminal, in accordance with the embodiments of the present disclosure.

FIG. 7 is a schematic diagram showing a hardware architecture of a terminal, in accordance with the embodiments of the present disclosure. As shown in the figure, a terminal 700 includes, but is not limited to, components such as a radio frequency unit 701, a network module 702, an audio output unit 703, an input unit 704, a sensor 705, a display unit 706, a user input unit 707, an interface unit 708, a memory 709, a processor 710 and a power supply 711. A person skilled in the art can understand that a structure of the terminal shown in FIG. 7 does not constitute a limitation on the terminal, and that the terminal may include more or fewer components than the terminal shown in the figure, may combine certain components, or may have different component arrangement. In the embodiments of the present disclosure, the terminal includes, but is not limited to, a mobile phone, a tablet computer, a notebook computer, a palmtop computer, a vehicle-mounted terminal, a wearable device or a pedometer.

Optionally, a computer program that is stored on the memory 709 and executable on the processor 710, when executed by the processor 710, implements the following steps:

obtaining a remaining power of the terminal; and in a case where the remaining power of the terminal meets a preset condition and the terminal meets a camera raising-lowering condition, controlling the camera to maintain a raised state or a retracted state.

In this way, in the embodiments of the present disclosure, in the case where the remaining power of the terminal meets the preset condition and the terminal meets the camera raising-lowering condition, the camera of the terminal will be maintained in the raised state or retracted state, which avoids an increase in power consumption of the terminal due to frequently raising or lowering the camera.

It will be understood that, in the embodiments of the present disclosure, the radio frequency unit 701 may be used to receive and send information, or receive and send signals during a call. For example, the radio frequency unit 701 is used to receive downlink data from a base station, and send the downlink data to the processor 710 to process; in addition, the radio frequency unit 701 is used to send uplink data to the base station. Generally, the radio frequency unit 701 includes, but is not limited to, an antenna, at least one amplifier, a transceiver, a coupler, a low noise amplifier and a duplexer. In addition, the radio frequency unit 701 may also communicate with a network and other devices through a wireless communication system.

The terminal provides wireless broadband Internet access for the user through the network module 702, such as helping the user send and receive emails, browse web pages and access streaming media.

The audio output unit 703 may convert audio data received by the radio frequency unit 701 or the network module 702 or stored in the memory 709 into audio signals and output the audio signals as sound. Moreover, the audio output unit 703 may further provide audio output (e.g., a call signal reception sound, a message reception sound, etc.) related to a specific function performed by the terminal 700. The audio output unit 703 includes a speaker, a buzzer, and a receiver.

The input unit 704 is used to receive audio or video signals. The input unit 704 may include a graphics processing unit (GPU) 7041 and a microphone 7042. The GPU 7041 processes image data of still pictures or videos that are obtained by an image capture device (e.g., a camera) in a video capture mode or an image capture mode. Processed image frames may be displayed on the display unit 706. The image frames processed by the GPU 7041 may be stored in the memory 709 (or other storage media), or sent via the radio frequency unit 701 or the network module 702. The microphone 7042 may receive sound, and is able to process such sound into audio data. In a telephone call mode, the processed audio data may be converted for output into a format that may be sent to a mobile communications base station via the radio frequency unit 701.

The terminal 700 further includes at least one sensor 705, such as a light sensor, a motion sensor and other sensors. For example, the light sensor includes an ambient light sensor and a proximity sensor. The ambient light sensor may adjust a brightness of a display panel 7061 according to a brightness of the ambient light. The proximity sensor may turn off the display panel 7061 and/or backlight when the terminal 700 is moved near an ear. As a type of motion sensor, an accelerometer sensor may detect magnitudes of accelerations in all directions (generally three axes), and may detect a magnitude and a direction of gravity when the accelerometer sensor is motionless, and may be used to identify a gesture of the terminal (e.g., switching the screen between a landscape mode and a portrait mode, related games, and magnetometer attitude calibration), vibration recognition related functions (e.g., pedometer and tapping), etc. The sensors 705 may further include a fingerprint sensor, a pressure sensor, an iris sensor, a molecular sensor, a gyroscope, a barometer, a hygrometer, a thermometer and an infrared sensor, which will not be described in detail herein.

The display unit 706 is used to display information input by the user or information provided to the user. The display unit 706 may include the display panel 7061, and the display panel 7061 may be configured in a form of a liquid crystal display (LCD), an organic light-emitting diode (OLED), or the like.

The user input unit 707 may be used to receive input numerical or character information and generate key input signals related to the user settings and function control of the terminal. For example, the user input unit 707 includes a touch panel 7071 and other input devices 7072. The touch panel 7071, also known as a touch screen, may collect the users touch operations on or near the touch panel 7071 (e.g., the users operations on or near the touch panel 7071 by using any suitable object or accessory such as a finger and a touch pen). The touch panel 7071 may include two parts, i.e., a touch detection device and a touch controller. The touch detection device detects a users touch position, detects a signal generated by the touch operation, and transmits the signal to the touch controller; and the touch controller receives touch information from the touch detection device, converts the touch information into coordinates of a touch point, sends the coordinates of the touch point to the processor 710, receives a command from the processor 710 and executes the command. In addition, the touch panel 7071 may be implemented by using various types of touch panels such as a resistive touch panel, a capacitive touch panel, an infrared touch panel, or a surface acoustic wave touch panel. In addition to the touch panel 7071, the user input unit 707 may further include other input devices 7072. For example, the other input devices 7072 may include, but are not limited to, a physical keyboard, function keys (e.g., volume control keys, and a switch key, etc.), a trackball, a mouse and an operating lever, which will not be described in detail herein.

Further, the touch panel 7071 may cover the display panel 7061. After the touch panel 7071 detects a touch operation on or near it, the touch panel 7071 transmits the touch operation to the processor 710 to determine a type of a touch event, and then the processor 710 provides a corresponding visual output on the display panel 7061 according to the type of the touch event. Although in FIG. 7, the touch panel 7071 and the display panel 7061 are used as two separate components to implement input and output functions of the terminal, in some embodiments, the touch panel 7071 and the display panel 7061 may be integrated to implement the input and output functions of the terminal, which is not specifically limited herein.

The interface unit 708 is an interface for connecting an external device and the terminal 700. For example, the external device may include a wired or wireless headset port, an external power supply (or battery charger) port, a wired or wireless data port, a memory card port, a port for connecting a device with an identification module, an audio input/output (I/O) port, a video I/O port, and an earphone port. The interface unit 708 may be used to receive input (e.g., data information or power) from the external device and transmit the received input to one or more elements in the terminal 700, or may be used to transmit data between the terminal 700 and the external device.

The memory 709 may be used to store software programs and various data. The memory 709 may mainly include a program storage region and a data storage region. The program storage region may store an operating system and at least one application program required by functions (e.g., a sound playing function and an image playing function). The data storage region may store data (e.g., audio data and a phone book) created according to use of a mobile phone. In addition, the memory 709 may include a high-speed random access memory, and may further include a non-volatile memory, such as at least one magnetic disk storage device, a flash memory device, or other volatile solid-state storage devices.

The processor 710 is a control center of the terminal, connects all parts of the entire terminal through various interfaces and lines, and executes various functions of the terminal and processes data by running or executing software programs and/or modules stored in the memory 709 and invoking data stored in the memory 709, thereby performing overall monitoring on the terminal. The processor 710 may include one or more processing units. Optionally, an application processor and a modem processor may be integrated in the processor 710. The application processor mainly deals with operating systems, user interfaces and application programs, and the modem processor mainly deals with wireless communication. It will be understood that the modem processor may not be integrated into the processor 710.

The terminal 700 may further include the power supply 711 (e.g., a battery) for supplying power to all components. Optionally, the power supply 711 may be logically connected to the processor 710 through a power management system, so that functions such as charging management, discharging management, and power consumption management are achieved through the power management system.

In addition, the terminal 700 includes some functional modules that are not shown, which will not be described in details herein.

The embodiments of the present disclosure further provide a non-transitory computer-readable storage medium. The non-transitory computer-readable storage medium stores thereon a computer program that, when executed by a processor, implements processes of the embodiments of the method of controlling the camera described above, and can achieve same technical effects. In order to avoid repetition, details will not be repeated herein. The non-transitory computer-readable storage medium is, for example, a read-only memory (ROM), a random access memory (RAM), a magnetic disk or an optical disk.

It will be noted that, the terms such as "comprise" or any other variants thereof herein are intended to cover a non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "comprising a/an . . . " does not exclude existence of other identical elements in a process, a method, an article or a device that includes the element.

The embodiments of the present disclosure are described with reference to the accompanying drawings, but the present disclosure is not limited to the above specific implementation manners. The above specific implementation manners are illustrative only rather than restrictive. Various forms may be made by a person of ordinary skill in the art under the enlightenment of the present disclosure without departing from the purpose of the present disclosure and the protection scope of the claims, which shall all be included in the protection scope of the present disclosure.

What is claimed is:

1. A method of controlling a camera, applied to a terminal including a display screen and a camera, operating states of said camera including a raised state and a retracted state, wherein said method comprises:

obtaining a remaining power of said terminal; and in a case where said remaining power of said terminal meets a preset condition and said terminal meets a camera raising-lowering condition, controlling said camera to maintain said raised state or said retracted state;

wherein in the case where said remaining power of said terminal meets said preset condition and said terminal meets said camera raising-lowering condition, controlling said camera to maintain said raised state or said retracted state includes:

in a case where said remaining power of said terminal is less than or equal to a first power threshold and said terminal meets said camera raising-lowering condition, controlling a driving mechanism to enter a first operating mode, so that said driving mechanism controls said camera to maintain said raised state or said retracted state;

in said first operating mode, said driving mechanism does not respond to a control instruction for driving said camera to be lowered or raised; and in a second operating mode, said driving mechanism responds to said control instruction for driving said camera to be lowered or raised.

2. The method according to claim 1, wherein in the case where said remaining power of said terminal is less than or equal to said first power threshold and said terminal meets said camera raising-lowering condition, after controlling said driving mechanism to enter said first operating mode, so that said driving mechanism controls said camera to maintain said raised state or said retracted state, said method further comprises:

displaying a prompt message on said display screen, wherein said prompt message is used to prompt whether to adjust said operating state of said camera;

in response to a first operation of adjusting said operating state of said camera, controlling said driving mechanism to enter said second operating mode, and adjusting said operating state of said camera to said raised state from said retracted state by driving said camera to be raised via said driving mechanism, or to said retracted state from said raised state, by driving said camera to be lowered via said driving mechanism; and controlling said driving mechanism to enter said first operating mode after adjusting said operating state of said camera to said raised state or said retracted state.

3. The method according to claim 2, wherein after controlling said driving mechanism to enter said first operating mode after adjusting said operating state of said camera to be said raised state or said retracted state, said method further comprises:

displaying a virtual switch used to switch said operating state of said camera on said display screen; and in response to a second operation on said virtual switch, controlling said driving mechanism to enter said second operating mode, and adjusting said operating state of said camera to said raised state by driving said camera to be raised via said driving mechanism.

4. The method according to claim 1, wherein said method further comprises:

in a case where said remaining power of said terminal is less than or equal to a second power threshold and an operating state of said camera is said raised state, controlling said driving mechanism to enter said second operating mode; and adjusting said operating state of said camera to said retracted state by driving said camera to be lowered via said driving mechanism;

wherein said second power threshold is less than said first power threshold.

5. A terminal, comprising a display screen, a camera, a memory, a processor, and a computer program that is stored in said memory and executable on said processor, wherein said computer program, when executed by said processor, causes said processor to perform the following steps:

obtaining a remaining power of said terminal; and in a case where said remaining power of said terminal meets a preset condition and said terminal meets a camera raising-lowering condition, controlling said camera to maintain said raised state or said retracted state;

wherein said terminal further comprises a driving mechanism used to drive said camera to be raised or lowered;

when said computer program is executed by said processor, said processor further perform the following steps:

in a case where said remaining power of said terminal is less than or equal to a first power threshold and said terminal meets said camera raising-lowering condition, controlling a driving mechanism to enter a first operating mode, so that said driving mechanism controls said camera to maintain said raised state or said retracted state;

in said first operating mode, said driving mechanism does not respond to a control instruction for driving said camera to be lowered or raised; and in a second operating mode, said driving mechanism responds to said control instruction for driving said camera to be lowered or raised.

6. The terminal according to claim 5, wherein when said computer program is executed by said processor, said processor further perform the following steps:

displaying a prompt message on said display screen, wherein said prompt message is used to prompt whether to adjust said operating state of said camera;

in response to a first operation of adjusting said operating state of said camera, controlling said driving mechanism to enter said second operating mode, and adjusting said operating state of said camera to said raised state from said retracted state by driving said camera to be raised via said driving mechanism, or to said retracted state from said raised state, by driving said camera to be lowered via said driving mechanism; and controlling said driving mechanism to enter said first operating mode after adjusting said operating state of said camera to said raised state or said retracted state.

7. The terminal according to claim 6, wherein when said computer program is executed by said processor, said processor further perform the following steps:

displaying a virtual switch used to switch said operating state of said camera on said display screen; and in response to a second operation on said virtual switch, controlling said driving mechanism to enter said second operating mode, and adjusting said operating state of said camera to said raised state by driving said camera to be raised via said driving mechanism.

8. The terminal according to claim 5, wherein when said computer program is executed by said processor, said processor further perform the following steps:

in a case where said remaining power of said terminal is less than or equal to a second power threshold and an operating state of said camera is said raised state, controlling said driving mechanism to enter said second operating mode; and adjusting said operating state of said camera to said retracted state by driving said camera to be lowered via said driving mechanism;

wherein said second power threshold is less than said first power threshold.

9. A non-transitory computer-readable storage medium, wherein said non-transitory computer-readable storage medium stores thereon a computer program that, when executed by a processor, implements steps in said method of controlling the camera according to claim 1.

* * * * *